United States Patent
Mertama et al.

(10) Patent No.: US 6,629,130 B2
(45) Date of Patent: *Sep. 30, 2003

(54) METHOD AND APPARATUS FOR PROCESSING ELECTRONIC MAIL

(75) Inventors: Markus Mertama, Tampere (FI); Teuvo Hyttinen, Tampere (FI); Jari Mäenpää, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,221

(22) Filed: Apr. 29, 1999

(65) Prior Publication Data

US 2003/0088704 A1 May 8, 2003

(30) Foreign Application Priority Data

Apr. 30, 1998 (FI) .................................................. 980970

(51) Int. Cl.[7] .............................................. G06F 13/00
(52) U.S. Cl. ........................ 709/206; 709/219; 709/328
(58) Field of Search ................................ 709/204, 206, 709/219, 223, 225, 328

(56) References Cited

U.S. PATENT DOCUMENTS

| 5,283,887 A | 2/1994 | Zachery ........................ 395/500 |
| 5,497,319 A | 3/1996 | Chong et al. .......... 364/419.02 |
| 5,524,137 A | 6/1996 | Rhee ............................. 379/67 |
| 5,706,434 A | 1/1998 | Kremen et al. ........ 395/200.09 |
| 5,737,395 A | 4/1998 | Irribarren ..................... 379/88 |
| 5,742,905 A * | 4/1998 | Pepe et al. .................. 455/461 |
| 5,751,791 A * | 5/1998 | Chen et al. .............. 379/88.13 |
| 5,781,901 A * | 7/1998 | Kuzma ......................... 707/10 |
| 5,826,062 A | 10/1998 | Fake, Jr. et al. ............ 395/500 |
| 5,905,777 A * | 5/1999 | Foladare et al. ......... 379/90.01 |
| 6,230,156 B1 * | 5/2001 | Hussey ........................ 707/10 |

FOREIGN PATENT DOCUMENTS

| EP | 0719016 A2 | 6/1996 |
| EP | 0 785 661 A2 | 7/1997 |
| WO | WO 94/06230 | 3/1994 |
| WO | WO 98/15091 | 4/1998 |

OTHER PUBLICATIONS

"Internet Message Access Protocol—Version 4rev1". 65 pages, Dec. 1996.

* cited by examiner

Primary Examiner—Viet D. Vu
(74) Attorney, Agent, or Firm—Perman & Green, LLP (57) ABSTRACT

A method and apparatus implementing the method for implementing electronic mail services. A message is produced by a terminal (10) comprising information about at least one processing directed to the content of an electronic mail message, carried out by an electronic mail server (11); said second message is transmitted to the server (11), said processing is carried out by the server (11) in response to said second message; and the processed message or its part is transmitted from the server (11) to a terminal (19). Enables the creation of services directed to the processing of the content of new electronic mail messages.

20 Claims, 11 Drawing Sheets

METHOD AND APPARATUS FOR PROCESSING ELECTRONIC MAIL

FIELD OF THE INVENTION

The present invention relates to a method and apparatus implementing the method for processing an electronic mail message. In the method, a first message is formed by an electronic mail server, the message comprising information on the structural parts of the electronic mail message arrived at the server, as well as on attributes relating to the content of said structural parts, said first message being transmitted from the electronic mail server to a terminal.

BACKGROUND OF THE INVENTION

Electronic mail is a telematic service, wherein messages can be stored in a computer memory for being read by a receiver. For the implementation of electronic mail, electronic mail servers acting as data transmission gateways are connected to a telecommunication network, which gateways transmit the electronic mail messages to one another until a destination computer is reached. The receiving computer stores the electronic mail message to a storage medium as an electronic mail message folder, which a user can access to check his/her mail and transmit the mail further into his own computer using a local mail client software. Mail client softwares follow a selected read protocol of which the POP (Post Office Protocol) and the IMAP (Internet Message Access Protocol) can be given as examples.

Initially, the structure of electronic mail mainly supported the transmission of English text between two users via a TCP/IP (Transmission Control Protocol/Internet Protocol) network. As it became more widely used, there was an increasing need to transmit, through different kinds of networks, different types of electronic mail messages which also contain text, graphics, images, voice or their combinations in using other languages as well. As a result of a common standardisation work, general specification that defines the structure of electronic mail messages, ie, the MIME (Multipurpose Internet Mail Extensions) has been developed. As a result of the development work, it is easier to transmit in the Internet electronic mail messages that have a clear structure, and the headings of electronic mail messages that are in a text format may contain characters not included in the US-ASCII set of characters (American Standard Code for Information Interchange). An electronic mail message can be parsed into parts and a description of the content of the structural part in question can be included in each structural part. Several electronic mail message formats can be applied to the structural parts of an electronic mail message, and the structural parts may also contain multi-part sub-structures. The parts that are in a text format may also contain characters not included in the US-ASCII set of characters.

However, a prerequisite for processing data in different formats is that an electronic mail client has the use of sufficient means for processing the data as required. One needs viewing programs, as well as conversion programs to edit the data into a format identifiable to the viewing programs, which sets requirements on the performance of the computer used for processing. Particularly in computers with a limited processor output and memory capacity, the processing of several file formats is problematic. Due to the rapid pace of software development, the versions of the used applications change quickly and, therefore, the client must constantly take care of the upgrading of the software in use.

It should also be noted that the MIME is basically a code of practice, and individual solutions implemented on the basis of it may have compatibility problems, which the user finds frustrating.

SUMMARY OF THE INVENTION

Now, a method and apparatus implementing the method have been invented to reduce the disadvantages presented above. It is characteristic of the method according to the invention that a second message is formed by a terminal, the message comprising information about at least one processing, directed to the content of the electronic mail message, to be carried out by a server; said second message is transmitted to the server; said processing is carried out by the server in response to said second message; and the processed message or part of it is transmitted from the electronic mail server to the terminal.

An object of the invention is also a terminal according to claim 8 for utilising electronic mail services implemented through a telecommunications network, the terminal comprising means for receiving a first message from a server, the first message comprising information about the structural parts of said electronic mail message and the attributes relating to the content of said structural parts. It is characteristic of the terminal that the terminal comprises means for forming a second message, the second message comprising information about at least one processing in the server, directed to the content of the electronic mail message, and means for transmitting the second message or its part to the server.

Another object of the present invention is an electronic mail server, according to claim 9, comprising a database for storing electronic mail messages, means for forming a first message comprising information about the structural parts of the electronic mail message that is in the database of the electronic mail server and the attributes relating to the content of said structural parts; and means for transmitting said first message from the electronic mail server to a terminal. It is characteristic of the electronic mail server that the electronic mail server comprises means for receiving a second message transmitted by the terminal, the second message comprising information about at least one processing in the server, directed to the content of the electronic mail message, means for carrying out said processing in response to the receiving of said second message; and means for transmitting the processed message or its part from the electronic mail server to the terminal.

Yet another object of the invention is a data transmission system that implements digital electronic mail services, according to claim 11, comprising one or more terminals, electronic mail servers, databases that are in connection with the electronic mail servers, as well as data transmission networks, the electronic mail server comprising means for forming a first message comprising information about the structural parts of an electronic mail message that is the database of the electronic mail server and the attributes relating to the content of said structural parts, and means for transmitting the first message to the terminal. It is characteristic of the data transmission system that the terminal comprises means for forming a second message comprising information about at least one processing, directed to the content of the electronic mail message, carried out in the server, and means for transmitting the second message to the server; the electronic mail server comprising means for receiving said second message, means for carrying out said processing in response to said second message, and means for transmitting the processed message or its part from the electronic mail server to the terminal.

The invention is based on that a server reports a received electronic mail message in a parsed format, whereupon a client is informed of the structure of the electronic mail message and attributes relating to the content of the structural parts. These could be, e.g. the representation of the information contained in a structural part, the language of the text contained in a structural part, etc. The client determines, which processing activity is to be directed to the electronic mail message, forms a message corresponding to the processing by the terminal, and sends it to the electronic mail server. In response to the received message, the electronic mail server carries out the processing activity selected by the client. Due to a solution according to the present invention, an activity directed to the content of an electronic mail message can thus be implemented in a centralised manner by a server equipped with larger resources. Due to the invention, new services directed to the processing of the content of electronic mail messages can be created for a server in a simple way. The resources required for the implementation of the services can be concentrated to servers, which often have significantly more capacity for the implementation of the services than the user's terminal. The available range of tools can be more comprehensive and, due to the invention, software maintenance can be carried out in a centralised manner by the service provider. The invention is particularly useful to mobile subscriber often having terminals with limited capacity. As the solution, according to the invention, can also easily be implemented for terminal and server equipment, a significant advantage as compared to the existing solutions can be gained by means of an extension that can easily be adapted to the standard.

BRIEF DESCRIPTION OF THE DRAWINGS

In the following, the present invention will be discussed in detail by referring to the enclosed drawings, in which.

DETAILED DESCRIPTION

Figure 1:
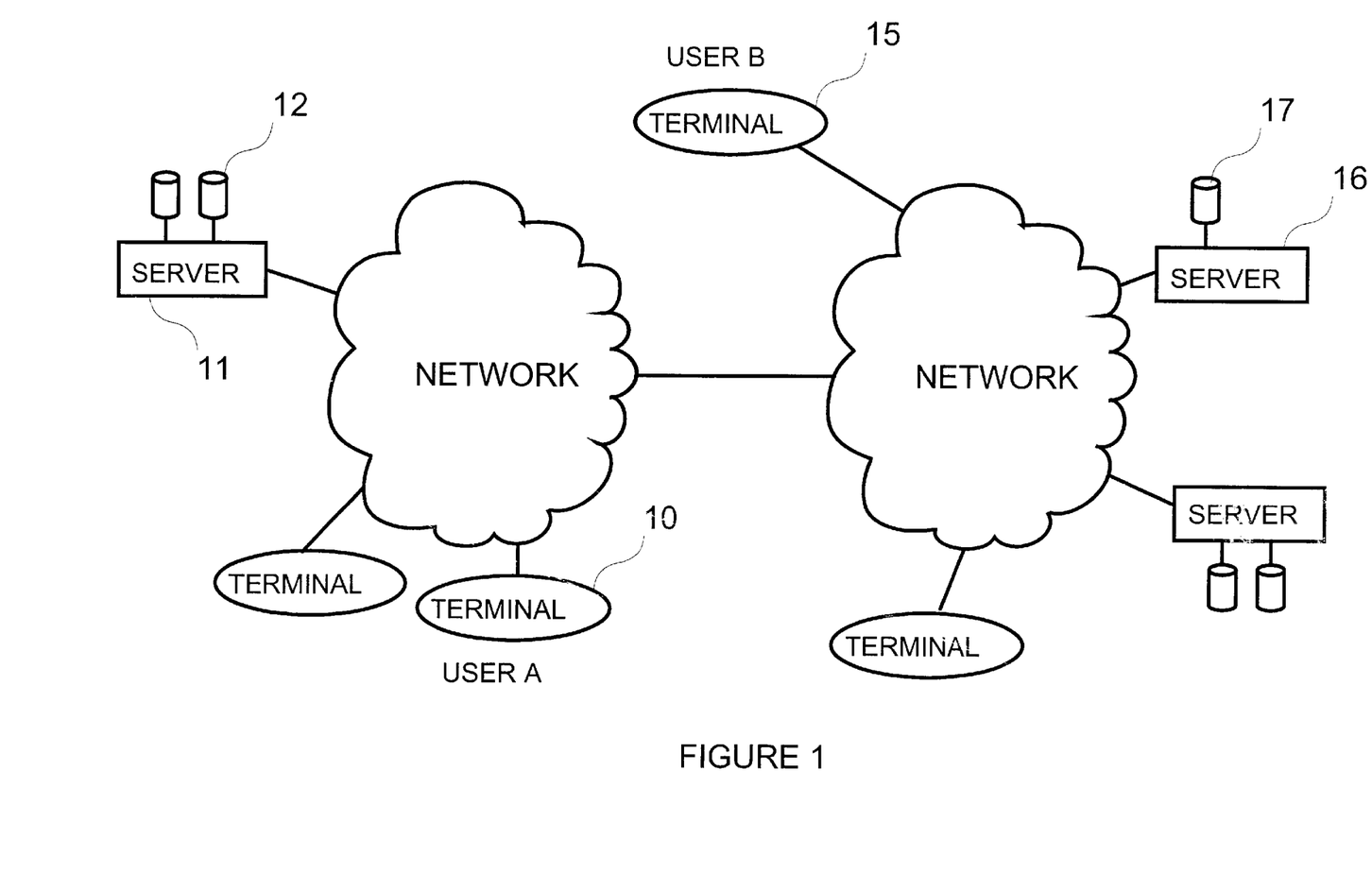
FIG. 1 is a block diagram illustrating the implementation of electronic mail in principle.

The block diagram in FIG. 1 illustrates the implementation of electronic mail in principle. A terminal 10 comprises a user interface and takes care of the duties relating to the presentation and processing of electronic mail. The terminal 10 has been connected to a network 13, which provides a data transmission mechanism for implementing the transmission of data between the terminal 10 and a server 11. The server 11 takes care of the receiving of the incoming electronic mail messages and the transmitting of the outgoing messages through the network 13. Databases 12, comprising user- or user group-specific mailboxes wherein the electronic mail messages arrived from the network 13 and the terminal 10 are stored, have been coupled in connection with the server. A data transmission system implementing electronic mail service s normally comprises several terminals 10, 15, servers 11, 16, databases 12, and networks 13, 18.

The terminal 10 functions as a client computer CLIENT, which launches an electronic mail service by contacting the server 11 that functions as a host computer SERVER. After confirming the user's identity, the server offers the user access to those mailboxes to which he has been defined rights. In case of incoming mail, depending on the used electronic mail protocol, the user can download the files in the mailbox to his own terminal for future processing (POP) or he is capable of directly giving commands for the processing of he mailboxes at the server (IMAP). In case of outgoing mail, a user A using the terminal 10 draws up an electronic mail message, gives it to the server 11, which sends the electronic mail message, through the network 13, 18, into the mailbox of a user B stored in a database 17 of the receiver's electronic mail server 16, from where the user B can fetch the electronic mail message for his/her use, e.g. through a terminal 15.

Figure 2:
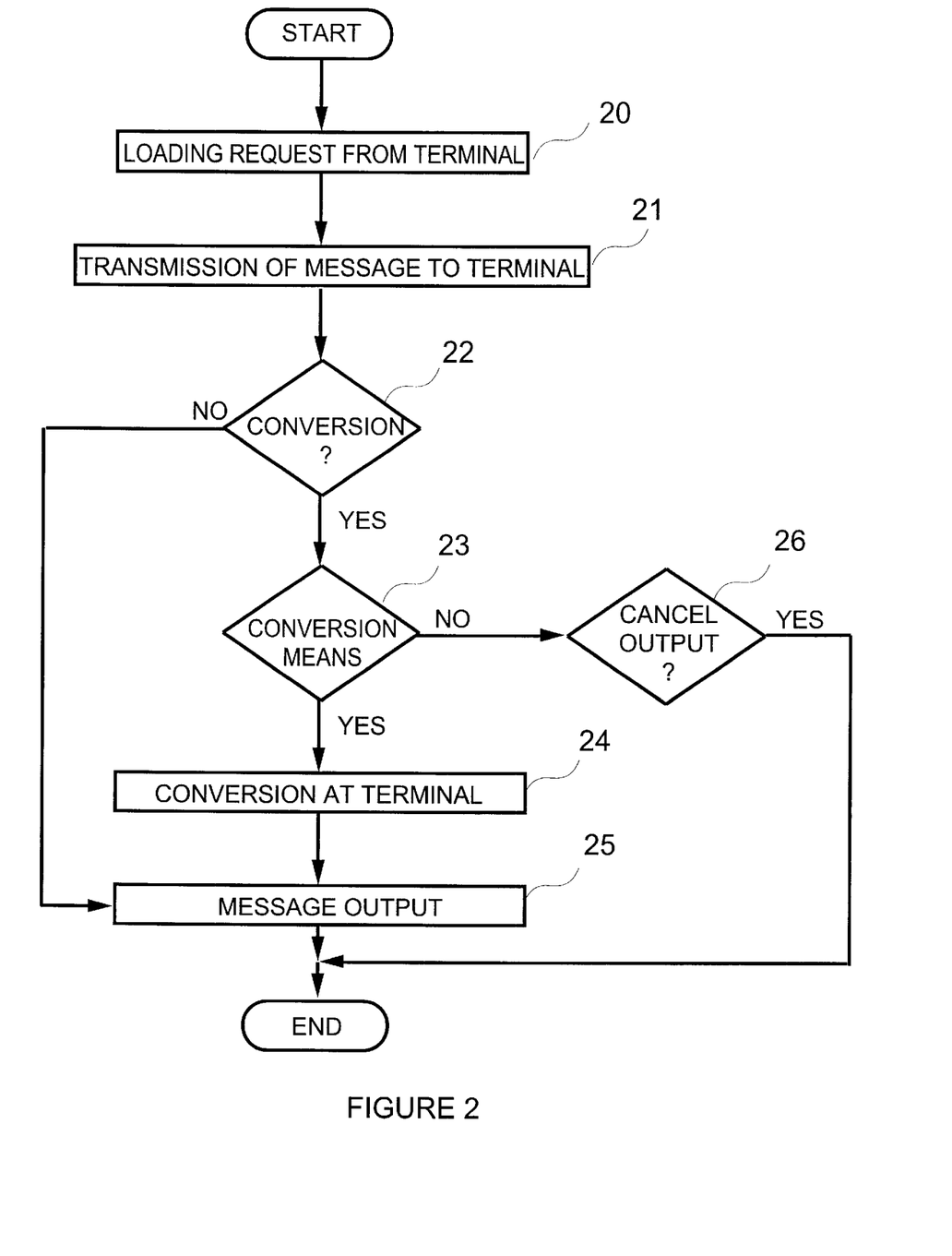
FIG. 2 is a flow diagram illustrating phases for outputting an electronic mail message, arrived at an electronic mail server, to a subscriber's terminal, implemented according to prior art.

In the following, we will illustrate a solution according to the invention using the processing of file formats, contained in an electronic mail message, as an example. FIG. 2 shows a flow diagram illustrating phases for outputting an electronic mail message arrived at the electronic mail server (SERVER), to the user terminal 10 (CLIENT), implemented according to prior art. When the user contacts the electronic mail server with his/her terminal, he/she receives a message from the server 11 of the electronic mail messages stored in the mailbox. In the following, the term client will be used when describing activities carried out by the terminal either independently or controlled by a subscriber. In step 20, the client gives the server a downloading request directed to a specific electronic mail message. In step 21, the server sends said electronic mail message to the client. In step 22, the client checks the file formats contained in the electronic mail message and concludes whether it can output the electronic mail message in this format or whether the electronic mail message should be converted before output. Depending on the application, the electronic mail message can be output, e.g. as text, graphics, voice or a combination of these. If no conversion is required, the electronic mail message is transmitted to the client and output (step 25). If conversion is required, the client checks whether it has the use of the necessary means for carrying out the conversion (step 23). If conversion is possible, the client carries out the conversion (step 24) and outputs the electronic mail message (step 25). If there are no means for carrying out the conversion, the client may choose (step 26) whether the electronic mail message is not output at all, in which case the processing of the electronic mail message terminates here (goes to END), or whether the electronic mail message is output without converting it, in which case part of the content of the electronic mail message remains unutilised (goes to step 25).

The latest MIME-compatible electronic mail programs enable that the client can inquire of the server about the structure of the arrived electronic mail message and check the conversion need and possibilities before the electronic mail message is transferred to the client. If the client has no need or possibility to carry out the conversion, an unnecessary transmission of data can be avoided by determining the conversion need before the transmission. Today, there quite often appears a need to maintain an increasingly large conversion resource due to the rapid development of software and the continuously increasing number of file formats used. On the other hand, users are extremely interested in accessing electronic mail services by means of portable terminals, such as mobile stations or computers. However, the mobility of the terminal sets limits on the available capacity and processor output and, therefore, the management and processing of many different file formats in connection with a mobile terminal may become extremely troublesome.

Figure 3:
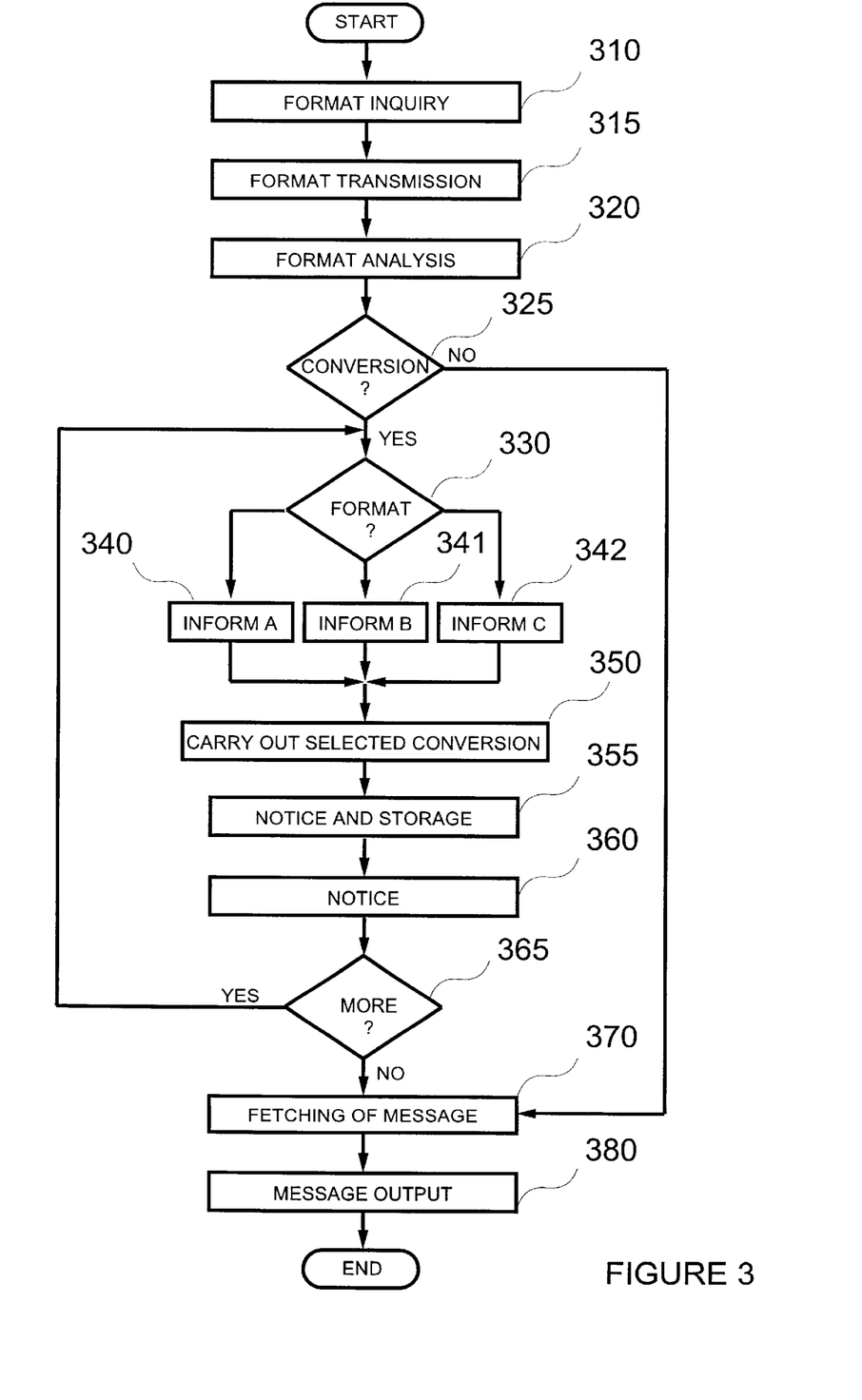
FIG. 3 is a flow diagram illustrating the basic principle of a solution, according to the invention, in connection with the processing of a file format contained in an electronic mail message.

FIG. 3 illustrates characteristics of a solution, according to the present invention, in connection with the processing of a file format contained in an electronic mail message. The invention utilises the opportunity, provided by the latest electronic mail protocols, to parse the structure of electronic mail messages and to express it to the client as necessary. In step 310, a terminal sends a server an inquiry about the structure of a selected electronic mail message. The electronic mail message is identified by means of a tag, which unambiguously identifies the message in said mailbox. The server has parsed the structure of the electronic mail message in connection with the arrival of the electronic mail message or parses it now, according to prior art, and informs the terminal of the structure (step 315). The terminal analyses the format of the structural parts of the electronic mail message and checks the need for conversion (step 320). If no conversion is needed (step 325), the electronic mail message can be transmitted from the server to the terminal (step 370) and output to the user (step 380). Depending on the application, the message can be output, e.g. as text, graphics, voice or their combination. If conversion is necessary (step 325), the required conversion type is specified (step 330). The terminal may carry out the specification automatically on the basis of its own conversion resources or it may ask, through a user interface, for user's instructions to carry out the conversion. After selecting the conversion type, the terminal informs the server of it (steps 340, 341, 342). The server carries out the selected conversion (step 350), gives the converted electronic mail message a new identifying tag, and stores the electronic mail message in the mailbox (step 355). When the server has informed the client of the carrying out of the conversion and the new tag of the converted electronic mail message (step 360), the user can decide whether he/she wants to further process the original electronic mail message or the converted electronic mail message (step 365). This kind of further processing can be, e.g. translating an electronic mail message, converted into a specific text format, into another language. If further processing is required, the processing returns to step 330, where the required conversion is specified. If no further processing is required the electronic mail message is transmitted in the desired format from the server to the terminal (step 370), and it is output (step 380).

In the following, we will present a preferred embodiment of the present invention in connection with a MIME-compatible IMAP4 electronic mail protocol. Originally, the IMAP is an electronic mail protocol at the Stanford University, which allows a client to manipulate contents of remote mailboxes, to be stored by host computers, in the same way as local files. For a more detailed description of the IMAP4 protocol and its version 1, we refer to the code of practice Network Working Group RFC 2045 (Requests for Comments), which can be found in several Internet sources; at the time this application was prepared, at the address of http://ds.internic.net.

Figure 4:
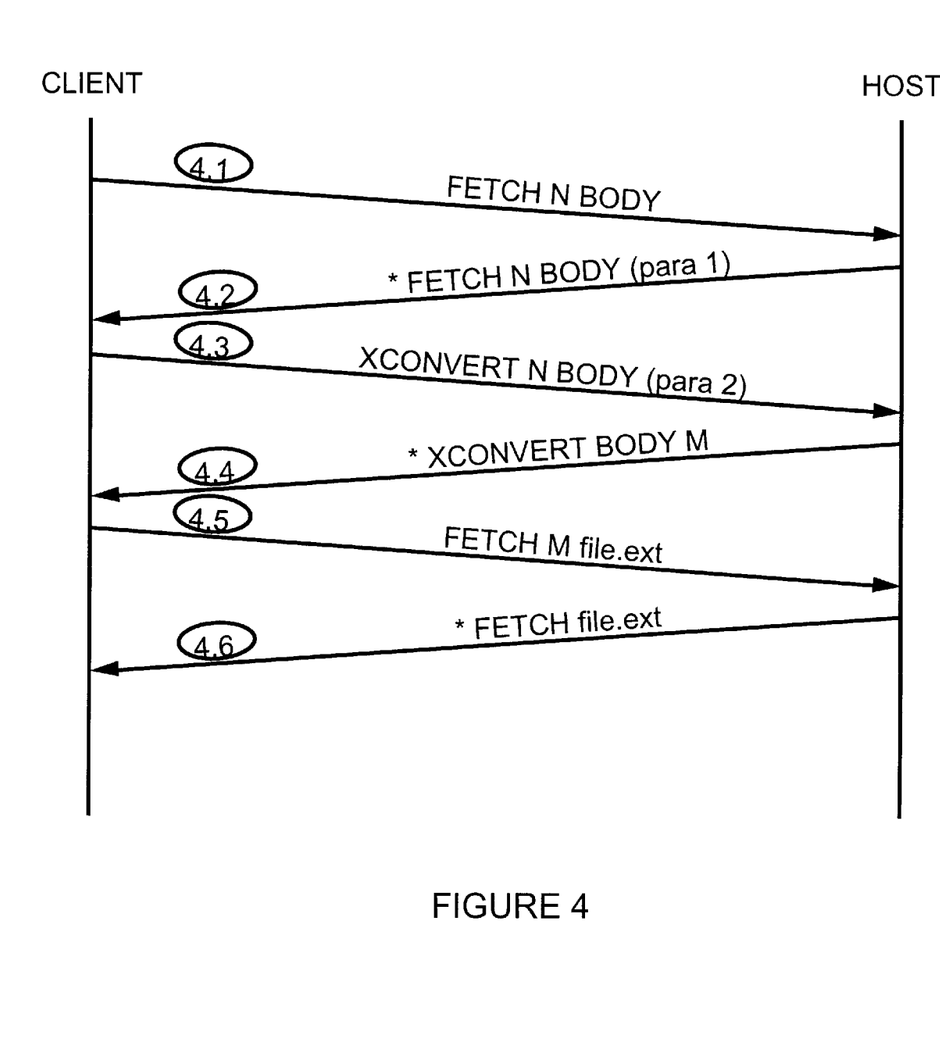
FIG. 4 is a signalling diagram illustrating data transmission between a subscriber's terminal CLIENT and a SERVER when implementing electronic mail service in a manner according to a first preferred embodiment of the invention.

The signalling diagram in FIG. 4 illustrates the transmission of data between the client's terminal CLIENT and the electronic mail message server SERVER in an electronic mail service implementation according to the invention. A message 4.1 contains a FETCH command, according to the IMAP4 protocol, by means of which data relating to the electronic mail message is fetched from a mailbox. The command arguments contain a non-volatile message tag N, which unambiguously identifies the electronic mail message inside the mailbox, as well as a command argument BODY, which denotes that, in this case, the data unit to be fetched is the structure of the electronic mail message in question. In the IMAP4 protocol, the message can be referred to in two ways; using the consecutive number or the unique identifier (UID) of the message. Here, the structure of an electronic mail message means an itemisation of different types of structural units, of which the electronic mail message is formed, and attributes describing the content of said structural units. The server returns a FETCH response message 4.2, wherein a parameter string para 1, in brackets, denotes the structure of an electronic mail message N.

The parameter string, according to the IMAP4 protocol, that denotes the structure is made up of eight pare meters separated by a space. The electronic mail message can be made up of one structural part or more, the order between them and the attributes relating to the content of the parts being denoted by means of the MIME structure. For example, the MIME structure of a two-part electronic mail message containing text and a BASE64-coded text attachment in the IMAP protocol can be denoted by a parameter string (("TEXT" "PLAIN" ("CHARSET" "US-ASCII") NIL NIL "7BIT" 1152 23) ("TEXT" "PLAIN" ("CHARSET" "US-ASCII" "NAME" "cc.diff") "<960723163407.20117h@cac.washington.edu>" "Compiler diff" "BASE64" 4554 73) "MIXED")). For the detailed structure and content of the parameters, we refer to the above-mentioned RFC 2045 code of practice.

In the IMAP protocol, an asterisk |*|denotes an untagged response, which does not directly refer to any specific electronic mail message. A response given from a server to a question presented by a terminal is also commenced with an asterisk and terminated with a line beginning with a tag. In FIG. 4, the asterisk |*|correspondingly denotes that the message in question typically describes data transmission, which is one command line longer and ends in a command line beginning with a tag.

After being informed the format of the electronic mail message denoted by the tag N, the terminal determines the conversion needs relating to the electronic mail message. If the electronic mail message contains parts for the processing of which the terminal has no means, it will identify the need for conversion. The terminal can make the conversion decision automatically on the basis of the available resources or the user may participate in the decision-making process through a user interface of the terminal. For example, the terminal may first identify the possible conversion need and then express said need and the alternative further measures to the user for carrying out the conversion decision. When the conversion decision has been made, the terminal sends the servers a message 4.3, which, according to the invention, controls the carrying out of the conversion at a server. The argument N of a conversion command XCONVERT denotes the tag of the selected electronic mail message, and the parameters of the argument BODY specify a new structure according to which the selected electronic mail message should be converted. In response to the message 4.3, the server initiate S the conversion after which it returns a response message 4.4 informing of the success of the conversion. If the server has not identified the command contained n the message 4.3, the response message 4.4 will contain the result BAD. If the server has identified the command, but the conversion has not succeeded, the response message 4.4 will contain the result NO. If the conversion has succeeded, the response message 4.4 will contain the result OK, as well as a new tag, which unambiguously identifies the new electronic mail message stored in the mailbox in the converted format.

After the conversion, the client can fetch the electronic mail message from the mailbox by means of the FETCH command (message 4.5). Because it is a question of a service directed to the contest of an electronic mail message, the name file.text, included in the header data of the electronic mail message, has not changed in the conversion. A tag M denotes whether it is a question of an electronic mail message that is in its original format or in a converted format. The electronic mail message M is transmitted from the server to the terminal for output in a message 4.6.

As often presented above, the advantage gained from the invention is significant particularly from the viewpoint of a user accessing electronic mail by means of a mobile terminal, the memory and performance capacity of which is limited due to the supporting of mobility. In the following, we will describe the invention when adapted to a mobile station operating in the GSM system (Global System for Mobile Telecommunications) without restricting the invention to the elements or terms presented above. The used network can be any access network or combination of networks suitable for the utilisation of electronic mail services, such as the General Packet Radio Service (GPRS) supporting GSM system, Ethernet, Token Ring, etc. and the terminal can be any client of the access network having the necessary means for using the electronic mail services.

Figure 5:
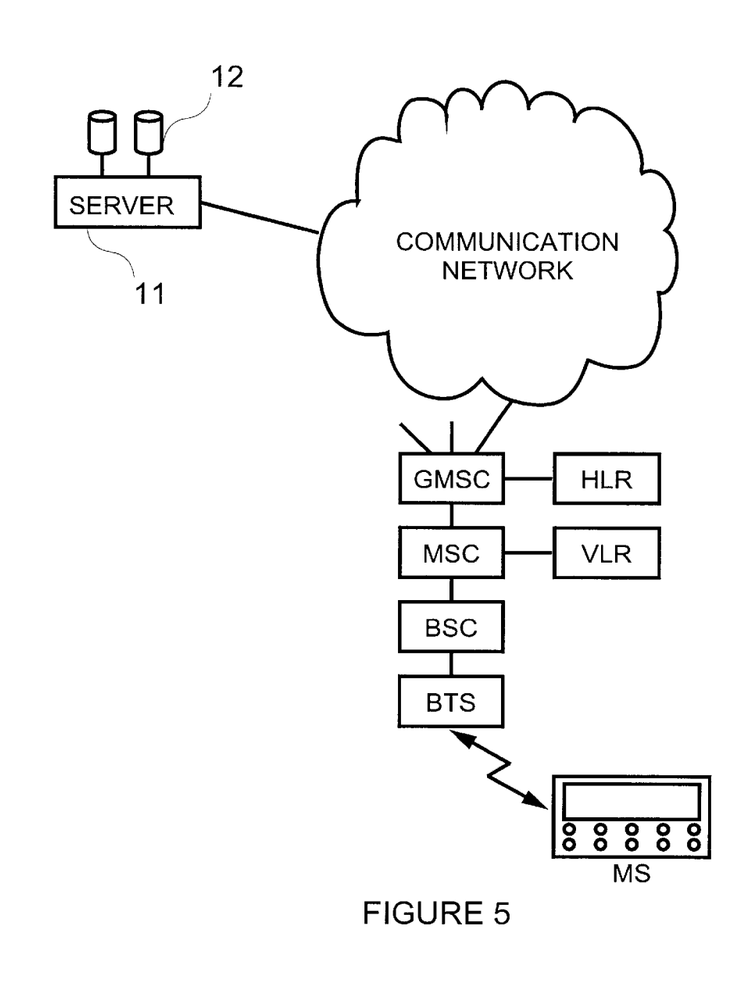
FIG. 5 is a block diagram showing an arrangement for utilising electronic mail services through a GSM mobile communication network.

The block diagram in FIG. 5 shows an arrangement for utilising electronic mail services through a digital GSM system, whereupon part of the network according to FIG. 1 is made up of the GSM network. Mobile stations MS are in communication with base transceiver stations (BTS) using radio communication. The base transceiver stations are, through a so-called Abis interface, further in communication with a base station controller (BSC), which controls and manages several base stations. The entity formed by several base stations BTS (typically some dozens of base stations) and a single base station controller BSC controlling them is called a base station subsystem (BSS). The base station controller BSC manages radio-communication channels and handovers in particular. On the other hand, the base station controller BSC is, through a so-called A interface, in communication with a mobile services switching centre (MSC) which, by means of a home location register HLR, containing permanent client data, and a visitor location register VLR, containing changing client data, co-ordinates the establishment of connections to and from mobile stations. Through the mobile services switching centre MCS, a connection is further established to outside the mobile telephone network, i.e. through the network to an electronic mail server. The mobile telephone network may also comprise a gateway mobile services switching centre GMSC, where to a call from outside the mobile services switching centre is directed when it is not directly directed to the MSC of the mobile telephone network in the area of which the mobile station is located.

Figure 6:
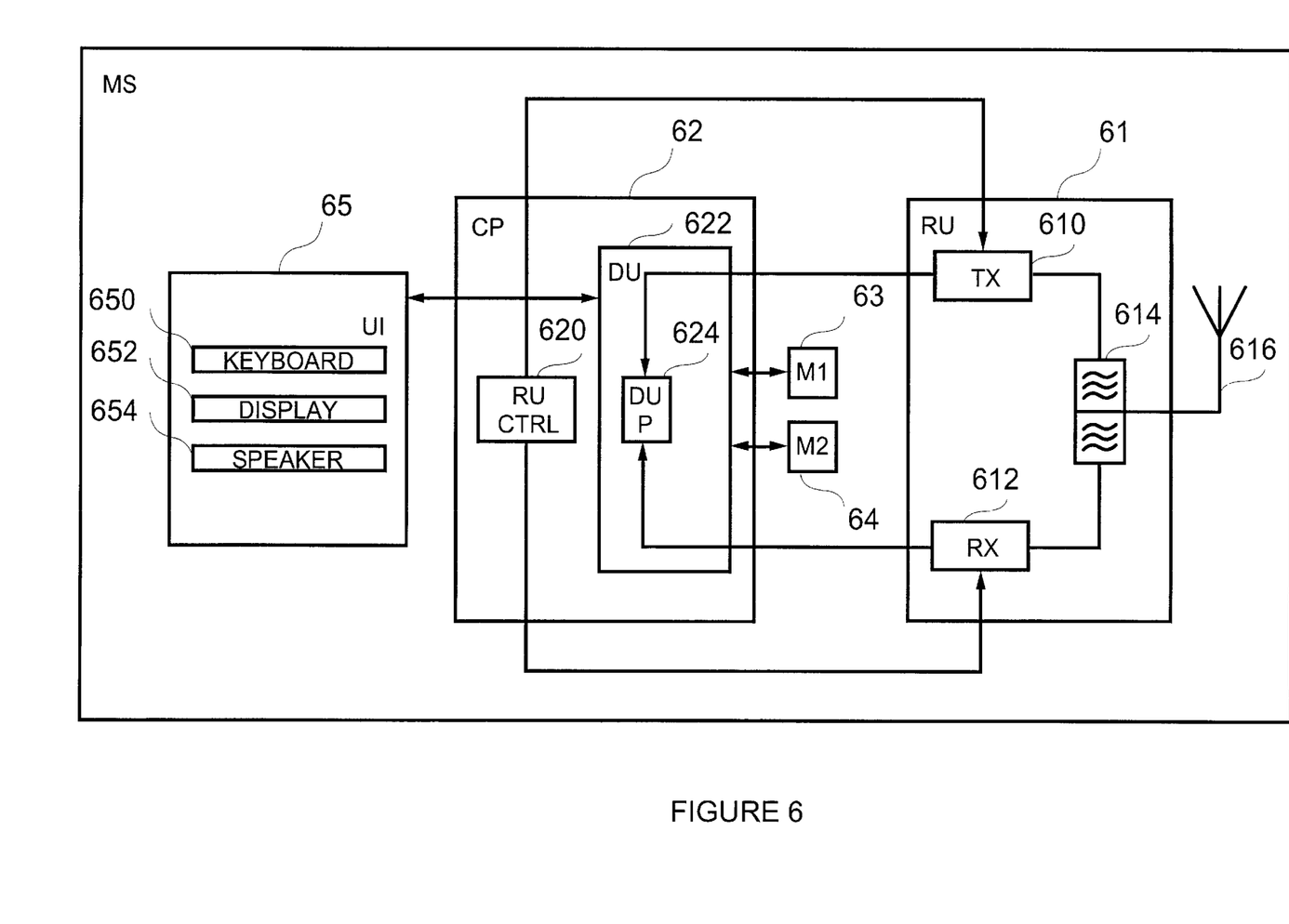
FIG. 6 is a block diagram illustrating one implementation of a terminal according to the invention.

The user interface of an ordinary mobile station is primarily designed for calls and, therefore, a preferred mobile terminal for utilising electronic mail services is a communicator which, n addition to the ordinary mobile station functions, comprises a data processing section facilitating the utilisation of electronic mail. The block diagram in FIG. 6 illustrates an implementation of a terminal according to the invention. The terminal in question is a communicator comprising circuits and a user interface enabling the processing of electronic mail.

A terminal 10 contains a radio unit 61 for communication using radio communication, the radio unit comprising a transmitter branch 610 (comprising functional blocks carrying out channel coding, interleaving, encryption, modulation and transmission), known from an ordinary mobile station, a receiver branch 612 (comprising functional blocks carrying out reception, demodulation, decryption, de-interleaving and channel decoding), a duplex filter 614 separating the reception and transmission for transmission using radio communication, as well as an antenna 616.

The operation of the terminal is controlled by a main control circuit 62, which further comprises a RU controller 620 carrying out control functions of an ordinary mobile station. In addition, said main control circuit comprises a data processing unit 622 for carrying out and controlling the terminal's data processing functions. The controls of the radio unit 61 and the data processing unit 622 do not have to be integrated into a control circuit. Instead, they can also be implemented apart from one another so that the RU control circuit 620 is on the radio unit's side and, on the data processing unit's side, there is a DU processor 624, which is in communication with the RU control circuit 620 for managing communication between the radio unit and the data processing unit.

In the implementation illustrated in FIG. 6, a first memory 630, which can be a volatile memory, e.g. RAM, wherein CP stores in-use data, is connected to the main control circuit 62. In addition, the terminal comprises a second memory 640, which preferably is a non-volatile memory, wherein the application programs performing the terminal's different services, other data essential for the functioning of the communicator and all other data that should be permanently stored, are stored. Alternatively, data can be stored in a memory of a smart card, to be separately connected to the terminal, from which there is a connection to the main control circuit 62. Such a smart card is known, e.g. from the GSM system as a so-called SIM card (Subscriber Identity Module).

In addition to those mentioned above, the terminal comprises a user interface (UI) 65 comprising at least a display 652, a speaker 654 and a keyboard 650. The client inputs the electronic mail messages and gives the commands by the keyboard that functions as input means, and the electronic mail messages are output by the display and/or the speaker which function as the terminal's output means.

If the data processing unit 622 and the radio unit 61 are implemented as functionally independent units, they both still have either a common or separate memory 630, 640, as well as a user interface UI. Communication between the units is managed through a connection between the DU processor 624 and the RU control unit 620.

Figure 7:
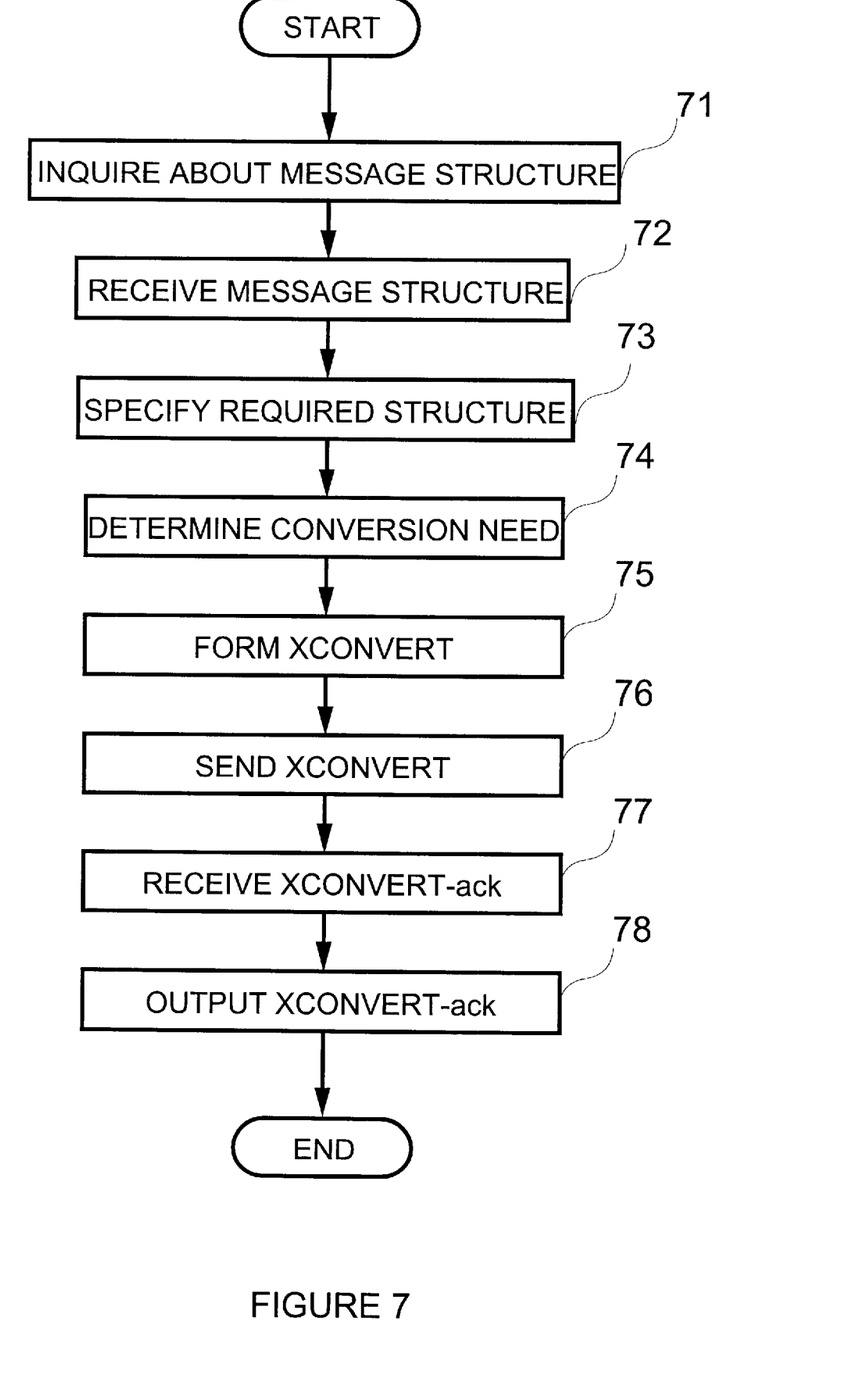
FIG. 7 is a flow diagram illustrating the operation of a terminal in an arrangement according to the invention.

With reference to said FIG. 6 and the flow diagram in FIG. 7, we will discuss below the implementation and operation of the terminal described above in connection with the first embodiment of the invention. The user gives the command to launch the electronic mail program through the user interface UI, whereupon the main control circuit CP fetches from the memory 640 the electronic mail application. The electronic mail application is processed by the DU processor 624. Said DU processor 624 controls the reception of the commands given by the user with the input means 650 and the outputting of the messages, transmitted to the user by the output means 652, 654, according to the electronic mail program. The DU processor also controls the transmission and reception of the messages relating to the electronic mail functions through the RU control circuit 620 that controls the functioning of the radio unit 61. When the user gives the command by means of the input means 650, the DU processor 624 processes the command and produces a possible message that corresponds with the operation for being transmitted through the user interface to the user or for being transmitted through the network to the electronic mail server. When it is a question of a message to be sent to the electronic mail server, the DU processor 624 forms a digital signal of the message for a transmitter 610. In a transmitter branch 610, the message is processed according to the mobile communication system including coding, interleaving, encryption, burst formation, modulation and transmission 616.

The message arrived from the electronic server first arrives at the receptor branch 612 of the radio unit RU, where the message is processed according to the mobile communication system including reception, demodulation, de-encryption, de-interleaving, and decoding. From the receptor branch, the processed message is transmitted to the DU processor, which processes the message and produces a possible message corresponding with the operation for being transmitted to the client through the user interface or for being transmitted to the electronic mail server through the network.

After the user has given, through the user interface 65, the command that launches the electronic mail program, the DU processor 624 fetches the electronic mail application from the memory 640 and begins to perform the program establishing a connection to the electronic mail server. After the establishment of the connection, the electronic mail server sends the terminal the information about the content of the user mailboxes. As described above in step 71, the terminal sends an inquiry directed to the structure of the message arrived at the electronic mail server and, in step 72, receives from the electronic mail server the structure of said electronic mail message. The inquiry can be adapted for being made automatically by the terminal or the inquiry command can be received from he user through the user interface. A terminal, according to the invention, determines the required structure (step 73) either by checking its own application resources stored in the memory 640 or by receiving a corresponding command from the user through the user interface. After this, the terminal determines the conversion needs (step 74) and then forms said XCONVERT command (step 75). The command is sent through a transmitter branch TX to the electronic mail server (step 76).

When the server has carried out the selected conversion, it informs the terminal of the success of the conversion. A receptor circuit RX transmits the acknowledgement message to the DU processor, which directs the information for being output for the client through the display means 652.

Figure 8:
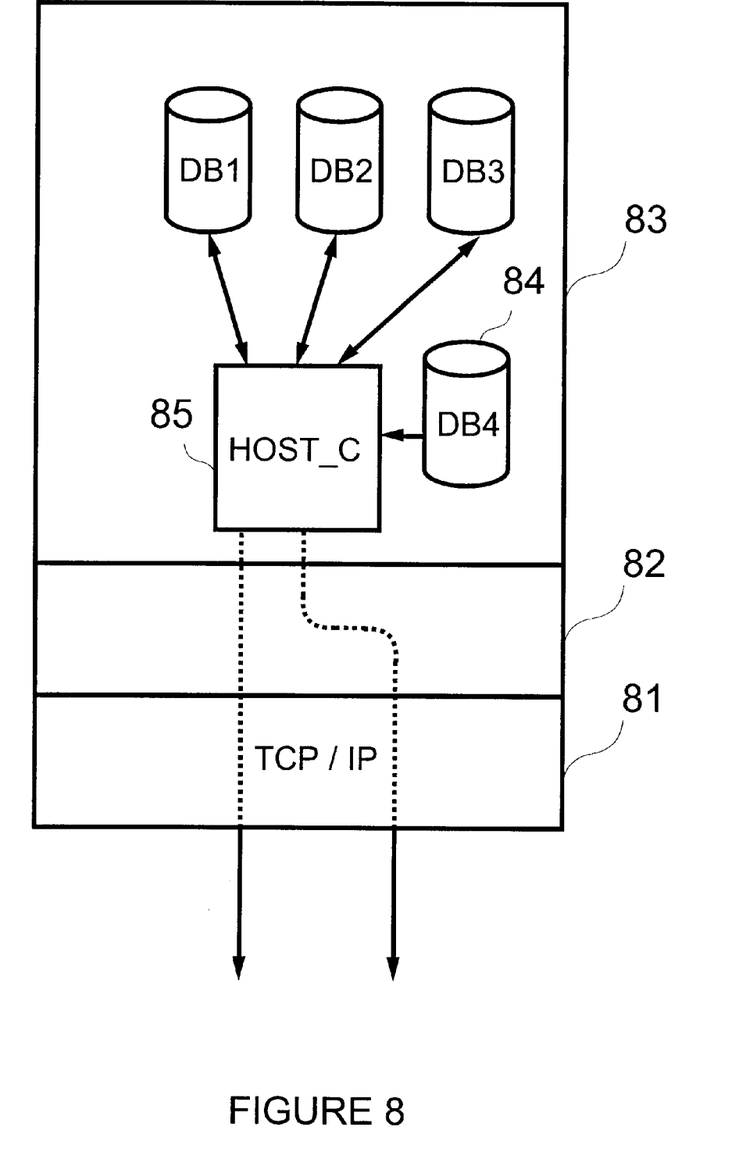
FIG. 8 is a flow diagram illustrating one implementation of an electronic mail server according to the invention.

The block diagram in FIG. 8 illustrates the implementation of an electronic mail server, according to the invention, in principle. The electronic mail server comprises a receptor/transmitter block 81 for transmitting data according to the selected transmission protocol (e.g. TCP/IP), a data link interpreter 82 (e.g. Winsocket) and a host block 83. The host block 83 comprises databases DB1–DN3, which contain at least the client data, as well as the accumulating databases for storing the incoming and outgoing electronic mail messages (mailboxes). In addition to this, the host block 83 comprises a central unit 85 for maintaining the electronic mail functions, e.g. for forming messages according to the selected read protocol and for implementing functions according to the received messages. An application block 84, comprising a number of applications for implementing the processing activities directed to the content of the electronic mail messages, has also been connected to the host block 83 of the electronic mail server according to the invention. Such applications can be, e.g. changes in the file format, translations from one language into another, etc.

Figure 9:
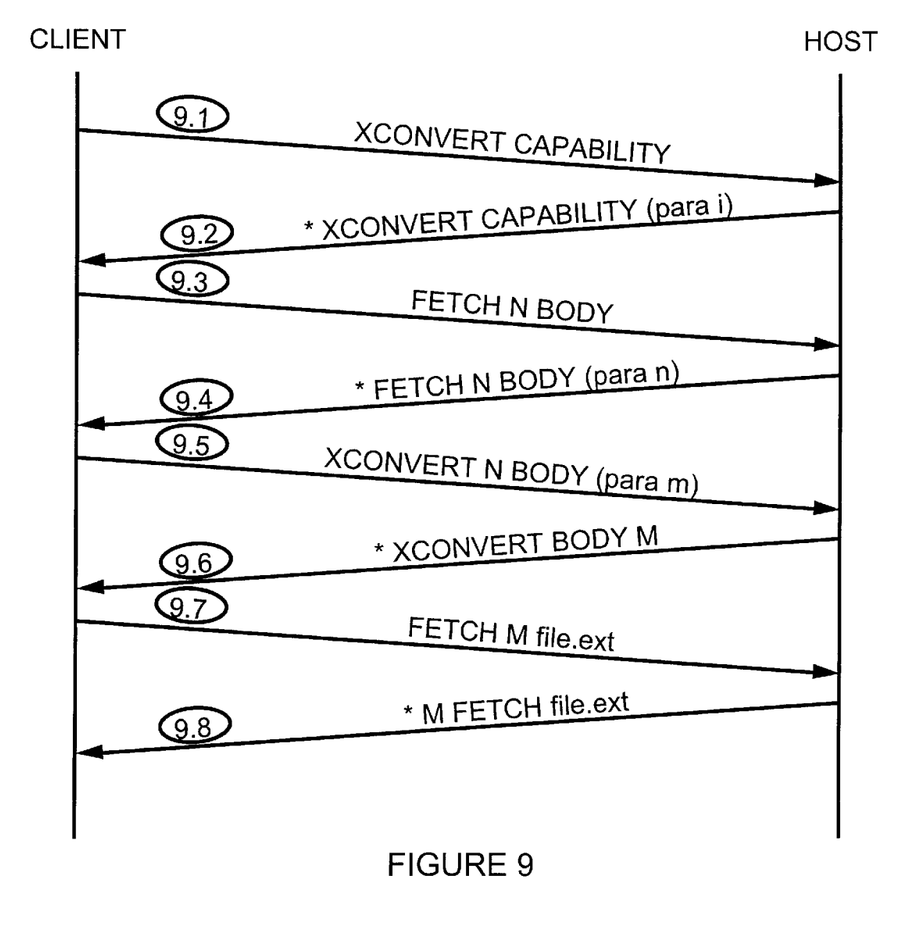
FIG. 9 is a signalling diagram illustrating data transmission between a subscriber's terminal CLIENT and a SERVER when implementing electronic mail service in a manner according to a second preferred embodiment of the invention.
Figure 10:
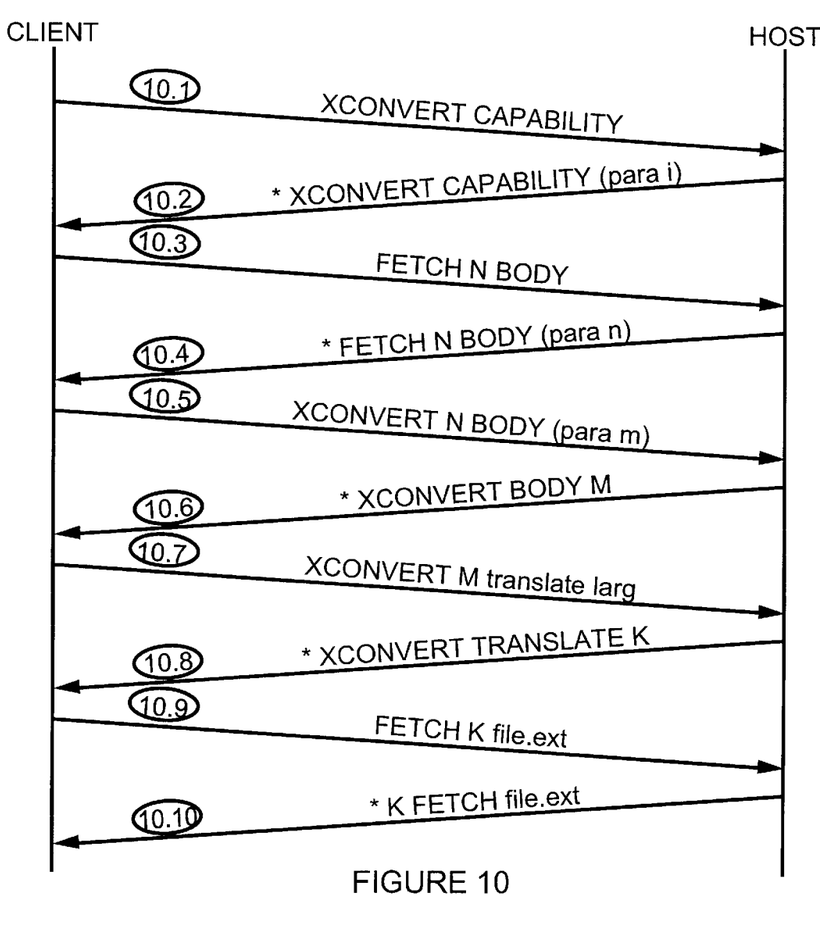
FIG. 10 is a signaling diagram illustrating the processing of an incoming electronic mail message when tie electronic mail message that has been converted into a correct file format should also be translated by translation tools available at a server.

As presented above, a client can contact several electronic mail servers through networks. Because it is not necessary for the clients to store information about the conversion capability of the different servers, the servers can be adapted to provide the information on possible conversions in response to a converted CAPABILITY command. Such second preferred embodiment of the present invention is shown in FIG. 9. The IMAP protocol comprises the command CAPABILITY by means of which the client can ask the server which extensions the server supports. The CAPABILITY command is independent of the status of the server and the terminal and, therefore, it is typically given only once during a session. If the server has been arranged to support the XCONVERT command, this becomes apparent from the server's response to the client. Before the transmission of the electronic mail messages, the client can send the server a message 9.1 comprising a command XCONVERT CAPABILITY, added to the IMAP protocol, which directs the CAPABILITY inquiry to the server's conversion resources. The serve returns the terminal a response message 9.2, which contains a list of the conversion s the server is capable of carrying out. Said list can be utilised when making the conversion decision by the terminal, whose own software selection is very limited. For example, the terminal can be adapted to automatically check the conversions available at the server and to ask for the electronic mail message in the required converted format that belongs to its own software selection whenever possible. As the messages 9.3–9.8 directly correspond with the messages 4.1–4.6, we refer to the corresponding steps in the descriptions of FIG. 4. In the embodiments presented above, the required function directed to the content of an electronic mail message was the processing of the file format. A solution according to the invention can also correspondingly be utilised in the implementation of other functions directed to the content of an electronic mail message. Some Internet access service providers already have means for translating the content of HTML pages from one language into another. Corresponding translation services can also be implemented by an electronic mail server. FIG. 10 illustrates the processing of an incoming electronic mail message presented above when an electronic mail message, converted into the correct file format, should also be translated by means of the translation tools available at the server. The CONVERT CAPABILITY command given in a message 10.1 (cf. the comments in connection with the message 7.1 and 7.2) contains an inquiry about all the functions provided by the server and directed to the content of the electronic mail message including the available languages. In a message 10.2, the server replies to the terminal providing a list of said functions. By means of messages 10.3 and 10.4, the structure of an electronic mail message is clarified as described above and by means of messages 10.5 and 10.6, an electronic mail message is created in a mailbox the file format of which has been converted into a required format param and the terminal is informed of the converted electronic mail message's tag M. The XCONVERT command included in a message 10.7 makes the server launch a translation function, directed to the electronic mail message identified by the tag M, for translating the language of the electronic mail message into a language lang. The server's response message contains a result BAD, NO or OK as presented above and a new tag K, which identifies the electronic mail message that is in the mailbox in he converted and translated format. After operations presented above, the client will have, at the server, the versions N, M and K of the electronic mail message, of which N is the electronic mail message in its original format, M is the electronic mail message having a converted file format, and K is the electronic mail message having a converted and translated format. By means of messages 10.9 and 10.10, the terminal fetches the version of a message file-ext, which is in the param format and in the lang language.

Above we have described a few functions directed to the content of an electronic mail message as preferred embodiments of the present invention, but there are many possibilities for the functionalities in question. In a manner according to the invention, an electronic mail server can be controlled, e.g. to manage de-encryption or the verification of authentication. In the described embodiments, the processing of the content of an electronic mail message at the serve was controlled by means of the XCONVERT command to be added to the IMAP4 protocol as an extension. This is only one alternative for implementing a solution according to the invention. For example, in connection with conversions of a file tope instead of using the XCONVERT command, the conversion function, according to the invention, can be implemented by means of a new argument to be defined for the FETCH command. As explained above in connection with the message 4.1, on the FETCH N BODY command, the terminal sends the server an inquiry about the format of the electronic mail message denoted by the tag N. The ALTERNATIVE BODY argument, in connection with the FETCH command, can be defined to control the server to return the terminal the electronic mail message format, which the server has produced after analysing the electronic mail message's original format. The new format functions as the server's primary proposal, in addition to which the server can present the rest of the available conversions as MULTIPART/ALTERNATIVE parts according to the MIME structure of the response message. When fetching the electronic mail message from the server, an indicator according to the IMAP protocol, which directs the fetch to the selected response message alterative, is added to the FETCH command.

Figure 11:
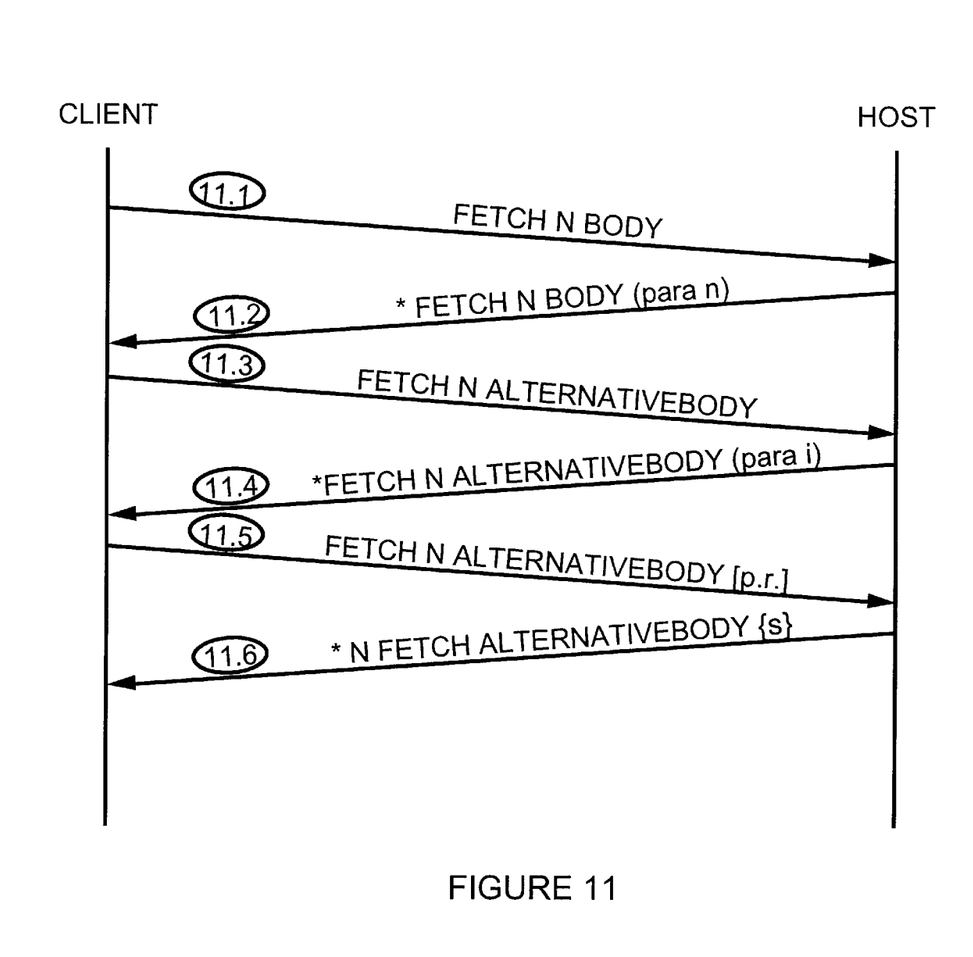
FIG. 11 is a signalling diagram illustrating the implementation of an embodiment utilising the argument ALTERNATIVEBODY in connection with the conversion of a file format.

FIG. 11 illustrates the implementation of the embodiment described above in connection with the conversion of a file format. A message 11.1 contains a normal FETCH command on which the terminal inquires of the server about the format of the electronic mail message identified by the tag N. A message 11.2 contains the server's response, which demotes the format of the original electronic mail message in a manner presented above. A message 11.3 comprises the FETCH command, the ALTERNATIVEBODY argument of which controls the server to return the alternative formats into which the server, after analysing the structure of the electronic mail message, has found that the electronic mail message can be converted. A message 11.4 contains the server's response message, which denotes said format and other possible alternative conversions as MULTIPART/ALTERNATIVE parts. A message 11.5 contains the FETCH command on which the terminal informs the server that it wants to receive the electronic mail message to be identified by the tag N in the format denoted by an alternative [p, r] contained by the response 11.4. The selected version of the electronic mail message is transmitted to the terminal in a message 11.6.

This paper presents he implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. Thus, the possibilities of implementing and using the invention are only restricted by the enclosed patent claims. Consequently, the various options of implementing the invention as determined by the claims, including the equivalent implementations, also belong to the scope of the invention.

What is claimed is:

1. A method for processing an electronic mail message including an attachment, the method comprising:

forming, in a electronic mail server, a first message comprising information about the structural parts of said electronic mail message and attributes relating to the content of said structural parts, the structural parts including a attachment, said server comprising multiple processing functionalities for the processing of attachments of electronic mail messages;

transmitting said first message from the electronic mail server to a terminal;

generating in the terminal, a second message comprising information about which of said processing functionalities to select for processing the attachment of the electronic mail message;

transmitting aid second message to the server;

processing the attachment in the server using the processing functionalty selected in the received second message; and transmitting the message with the processed attachment or its part from the electronic mail server to the terminal.

2. A method according to claim 1, wherein the attachment of the electronic mail message processed in the server is given a tag identifying the attachment of the message in the serve , said tag being different from the tag of an unprocessed attachment of an electronic mail message, and storing said attachment of the electronic mail message in a database of the server.

3. A method according to claim 1, wherein said message contains a command initiating processing in the server.

4. A method according to claim 1, wherein said first message comprises information about one or more alternative activities to be directed by the server to the content of the electronic mail message, and the second message comprises information about the selected activity.

5. A method according to claim 1, wherein said processing is a file format conversion.

6. A method according to claim 1, wherein said processing is translating a text from one language into another.

7. A method according to claim 1, wherein the first message comprises information about the MIME structure of the electronic mail message.

8. A terminal for utilising electronic mail services implemented through a telecommunications network, the terminal comprising:
   means for receiving a first message from a server, the server comprising multiple processing functionalities for the processing of attachments of electronic mail messages, the first message comprising information about the structural parts of said electronic mail message and the attributes relating to the content of said structural parts, the structural parts including an attachment, wherein the terminal further comprises:
   means for forming a second message, the second message comprising information about which of said at least one processing functionalities in the server to select for processing the attachment of the electronic mail message, and
   means for transmitting the second message or its part to the server in order to process the attachment in the server using the processing functionality selected in the second message; and
   means for receiving the electronic mail message with the processed attachment or its part from the server.

9. An electronic mail server comprising:
   a database for storing at least one electronic mail message including an attachment,
   means for forming a first message, the first message comprising information about the structural parts of the at least one electronic mail message, located in the database of the electronic mail server and the attributes relating to the content of said structural parts, the structural parts including the attachment, and
   means for transmitting said first message from the electronic mail server to a terminal, wherein the electronic mail server comprises:
   means for receiving a second message transmitted by the terminal, the second message comprising information about at least one processing functionality in the server for processing the attachment of the electronic mail message;
   means for carrying out said processing of the attachment using the processing functionality selected in the received second message, and
   means for transmitting the processed attachment from the electronic mail server to a terminal.

10. An electronic mail server according to claim 9, wherein the electronic mail server comprises means for providing the processed electronic mail message with a tag identifying an electronic mail message different from the unprocessed electronic mail message at said server, and means for storing the electronic mail message in the server's database.

11. A data transmission system implementing digital electronic mail services, the system comprising:
   one or more terminals, electronic mail servers, databases in connection with the electronic mail servers, and data transmission networks,
   an electronic mail server comprising means for forming a first message, the first message comprising information about the structural parts of the electronic mail message, located in the database of the electronic mail server, and the attributes relating to the content of said structural parts, the structural parts including an attachment, and
   means for transmitting the first message to a terminal;
   wherein the terminal comprises:
   means for forming a second message, the second message comprising information about at least one processing functionality for processing the attachment of the electronic mail message in the server, the server further comprising multiple processing functionalities for processing the attachment, and means for transmitting the second message to the server;
   wherein the electronic mail server comprises:
   means for receiving said second message,
   means for carrying out said processing of the attachment in response to said second message, and
   means for transmitting the processed attachment from the electronic mail server to the terminal.

12. A method for processing an electronic mail message including an attachment, the method, according to claim 1 wherein said step of transmitting is accomplished through the use of a mobile telecommunications network and said terminal is a mobile terminal.

13. A terminal for utilizing electronic mail services implemented through a telecommunications network, the terminal comprising means for receiving a first message from a server, the first message comprising information about the structural parts of said electronic mail message and the attributes relating to the content of said structural parts, the structural parts including an attachment, according to claim 8, wherein the telecommunications network comprises a mobile telecommunications network and said comprises a mobile terminal.

14. An electronic mail server, according to claim 9, wherein said means for transmitting comprises a mobile telecommunications network and said means for receiving comprises a mobile terminal.

15. A data transmission system implementing digital electronic mail services, the system, according to claim 11, wherein said means for transmitting comprises a mobile telecommunications network and said means for receiving comprises a mobile terminal.

16. The terminal of claim 9, the terminal further comprising a normal user agent in a multimedia server.

17. The terminal of claim 9 wherein the first message further comprises a multimedia message notification including a message reference that can be used by the terminal for retrieving a multimedia message form a recipient mmse.

18. The terminal of claim 17 wherein the message reference is valid throughout a message expiry period including successful retrieval of the multimedia message or until the multimedia message is rejected.

19. The method of claim 1 wherein the terminal comprises a normal user agent in a multimedia message server and the step of transmitting a first message further comprises transmitting a multimedia message notification that includes a message reference for retrieving the multimedia message.

20. The method of claim 1 further comprising requesting delivery of the multimedia message based on the message reference and delivery of the multimedia message to the user agent and performing data adaptation on the multimedia message based on a user profile or user agent capabilities.

* * * * *